US009612821B2

(12) United States Patent  
Iyer et al.

(10) Patent No.: US 9,612,821 B2
(45) Date of Patent: Apr. 4, 2017

(54) PREDICTING THE SUCCESS OF A CONTINUOUS SOFTWARE DEPLOYMENT PIPELINE

(71) Applicant: International Business Machines Corporation, Armonk, NY (US)

(72) Inventors: Sreekanth R. Iyer, Bangalore (IN); Vasanth K. Kodi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/790,130

(22) Filed: Jul. 2, 2015

(65) Prior Publication Data

US 2017/0003948 A1    Jan. 5, 2017

(51) Int. Cl.
*G06F 9/44* (2006.01)
*G06F 9/445* (2006.01)
*H04L 12/26* (2006.01)

(52) U.S. Cl.
CPC .............. *G06F 8/65* (2013.01); *H04L 43/045* (2013.01)

(58) Field of Classification Search
CPC ..................................... G06F 8/60; G06F 8/65
USPC ................................ 717/168–177; 709/203
See application file for complete search history.

(56) References Cited

U.S. PATENT DOCUMENTS

| | | | | | |
|---|---|---|---|---|---|
| 6,219,805 | B1 * | 4/2001 | Jones | .................. | G06F 11/3616 714/25 |
| 7,150,015 | B2 * | 12/2006 | Pace | .................. | G06F 8/60 709/236 |
| 7,412,430 | B1 * | 8/2008 | Moore | .................. | G06N 5/02 706/46 |
| 7,430,610 | B2 * | 9/2008 | Pace | .................. | G06F 8/60 707/999.01 |
| 7,490,073 | B1 * | 2/2009 | Qureshi | .................. | G06N 5/048 706/50 |
| 7,865,888 | B1 * | 1/2011 | Qureshi | .................. | G06N 5/048 717/168 |
| 7,926,051 | B2 * | 4/2011 | Barta | .................. | G06F 8/61 717/174 |
| 7,996,814 | B1 * | 8/2011 | Qureshi | .................. | G06N 5/048 717/100 |
| 8,046,755 | B2 * | 10/2011 | Gaa-Frost | .................. | G06F 8/60 717/168 |

(Continued)

OTHER PUBLICATIONS

Burg et al, "A Self-Adaptive Deployment Framework for Service-Oriented Systems", ACM, pp. 208-217, 2011.*

(Continued)

*Primary Examiner* — Anil Khatri
(74) *Attorney, Agent, or Firm* — Robert C. Bunker

(57) ABSTRACT

A method for predicting deployment success of a continuous deployment pipeline is provided. Initially, a user request may be received for node data from nodes that correspond to steps in the pipeline. The requests for node data may then be distributed to the appropriate nodes in the pipeline based on the received user request. Thereafter, the requested node data may be received as a response from the appropriate nodes in the pipeline and stored in a data repository. Then, a success prediction score may be calculated based on the stored node data and historical data. Finally, the calculated success prediction score may be displayed to the user through a dashboard.

14 Claims, 6 Drawing Sheets

(56) References Cited

U.S. PATENT DOCUMENTS

| | | | | |
|---|---|---|---|---|
| 8,151,146 | B2* | 4/2012 | Ostrand | G06F 11/008 714/47.1 |
| 8,302,092 | B2* | 10/2012 | Alverson | G06F 8/61 717/176 |
| 8,407,689 | B2* | 3/2013 | Dournov | G06F 9/45533 717/172 |
| 8,448,171 | B2* | 5/2013 | Donnellan | H04L 61/2007 718/1 |
| 8,479,188 | B2* | 7/2013 | Singh | G06F 21/577 717/168 |
| 8,533,537 | B2 | 9/2013 | Nemecek et al. | |
| 8,533,704 | B2* | 9/2013 | Wookey | G06F 8/68 717/174 |
| 8,666,777 | B2* | 3/2014 | Schumann | G06F 19/327 705/2 |
| 2014/0053135 | A1 | 2/2014 | Bird et al. | |

OTHER PUBLICATIONS

Mockus et al, "Interval Quality: Relating Customer-Perceived Quality to Process Quality", ACM, pp. 723-732, 2008.*

Otte et al, "Predictable Deployment in Component-based Enterprise Distributed Real-time and Embedded Systems", ACM, pp. 21-30, 2011.*

Petricic, "Predictable Dynamic Deployment of Components in Embedded Systems", ACM, pp. 1128-1129, 2011.*

Otte et al, "Infrastructure for Component-Based DDS Application Development", ACM, pp. 53-61, 2011.*

Pressler et al, "Execution Cost Estimation for Software Deployment in Component-based Embedded Systems", ACM, pp. 123-128, 2014.*

Wang et al, "Cloud-based Social Application Deployment using Local Processing and Global Distribution", ACM, pp. 301-312, 2012.*

Anonymous, "Mechanism for Operational Risk Monitoring, System Testing Optimization and Root Cause Analysis for Complex Applications," An IP.com Prior Art Database Technical Disclosure, Jul. 9, 2014, p. 1-17, IP.com No. 000237767.

Mell et al., "The NIST Definition of Cloud Computing," National Institute of Standards and Technology, Sep. 2011, p. 1-3, Special Publication 800-145.

Rajamanickam et al., "Risk-Based Test Coverage and Prioritization," Filed on Apr. 14, 2014, p. 1-44, U.S. Appl. No. 14/251,845.

Wikipedia, "DevOps," Wikipedia: the Free Encyclopedia, Last Modified on Apr. 16, 2015, p. 1-4, http://en.wikipedia.org/wiki/DevOps, Accessed on Apr. 20, 2015.

* cited by examiner

PREDICTING THE SUCCESS OF A CONTINUOUS SOFTWARE DEPLOYMENT PIPELINE

BACKGROUND

The present invention relates generally to the field of computing, and more particularly to software development methods and operations.

Increased software production release rates are often desirable to application and business unit stakeholders. Using development operations (DevOps) or agile methodologies may increase software production releases through a continuous deployment design practice embodied as a continuous deployment pipeline. A characteristic of continuous deployment practice includes deploying into a production environment new code/changes to an application. A release manager is required to approve or reject the rollout of changes to production.

SUMMARY

According to one exemplary embodiment, a method for predicting continuous deployment success of a continuous deployment pipeline is provided. The method may include receiving a user request for a plurality of indicators from a plurality of nodes, whereby each indicator within the plurality of indicators is associated with a node within the plurality of nodes and whereby the plurality of nodes are associated with the pipeline. The method may also include requesting the plurality of indicators from the plurality of nodes based on the received user request. The method may then include receiving the requested plurality of indicators. The method may further include storing the received plurality of indicators in a data repository. The method may also include calculating a success prediction score based on the stored plurality of indicators. The method may then include outputting the calculated success prediction score to the user.

According to another exemplary embodiment, a computer system for predicting continuous deployment success of a continuous deployment pipeline is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a user request for a plurality of indicators from a plurality of nodes, whereby each indicator within the plurality of indicators is associated with a node within the plurality of nodes and whereby the plurality of nodes are associated with the pipeline. The method may also include requesting the plurality of indicators from the plurality of nodes based on the received user request. The method may then include receiving the requested plurality of indicators. The method may further include storing the received plurality of indicators in a data repository. The method may also include calculating a success prediction score based on the stored plurality of indicators. The method may then include outputting the calculated success prediction score to the user.

According to yet another exemplary embodiment, a computer program product for predicting continuous deployment success of a continuous deployment pipeline is provided. The computer program product may include one or more computer-readable storage devices and program instructions stored on at least one of the one or more tangible storage devices, the program instructions executable by a processor. The computer program product may include program instructions to receive a user request for a plurality of indicators from a plurality of nodes, whereby each indicator within the plurality of indicators is associated with a node within the plurality of nodes and whereby the plurality of nodes are associated with the pipeline. The computer program product may also include program instructions to request the plurality of indicators from the plurality of nodes based on the received user request. The computer program product may then include program instructions to receive the requested plurality of indicators. The computer program product may further include program instructions to store the received plurality of indicators in a data repository. The computer program product may also include program instructions to calculate a success prediction score based on the stored plurality of indicators. The computer program product may then include program instructions to output the calculated success prediction score to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
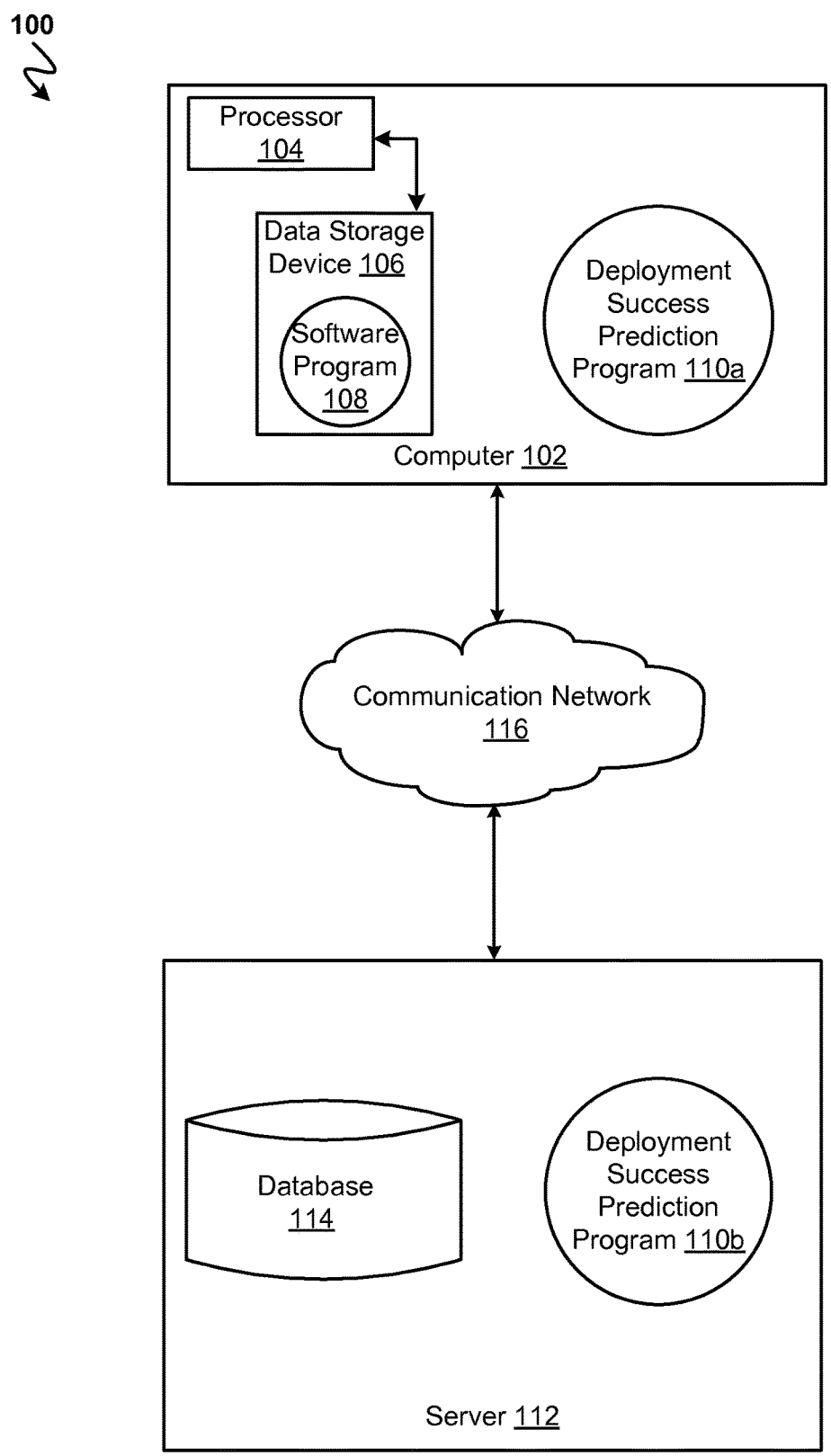
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for predicting continuous delivery success for development operations (DevOps) in cloud environments. As such, the present embodiment has the capacity to improve the technical field of continuous delivery software development by collecting specific data associated with the DevOps process and generating a success prediction score that provides a release manager with information to make a timely decision regarding the current delivery/deployment pipeline. More specifically, the present embodiment may collect user-defined information from various nodes within a continuous delivery pipeline that may be combined with recorded historical data to calculate a variety of parameters used in generating an overall success prediction score. Based on the success prediction score, a release manager may determine if a pipeline should be allowed to process the end deployment to production.

As described previously, increased software production release rates are often desirable to application and business unit stakeholders. Using DevOps or agile methodologies may increase software production releases through a continuous delivery design practice. A characteristic of continuous delivery practice includes deploying into a production environment new code/changes to an application. A release manager is required to approve or reject the rollout of changes to production.

In typical continuous deployment pipelines, there may be check gates at each step in the continuous deployment process, such as code review before moving to continuous integration or testing before promoting the build to another target environment. However, check gates may not provide any indication or confidence to the release manager regarding the potential success of the end deployment to production.

Apart from a high level view of the changes to the artifacts (i.e., elements that are inputs or outputs from a step in the deployment pipeline) usually provided by a change and configuration management system, the release manager may not have the relevant data or risk assessment information to approve or reject a roll out request. The release manager of the operations team often lacks any sort of quantitative or qualitative information to predict the success or failure of the deployment process.

A failed deployment may result in a resource intensive incident for an organization operating the continuous deployment pipeline. Resetting the continuous deployment pipeline may require significant time and effort to accomplish. It is often costly for an organization to re-spin or reattempt the deployment process.

Therefore, it may be advantageous to, among other things, provide a way to supply release managers/DevOps teams with concise and precise information from leveraging historical data (i.e., historical indicators) that can predict the success of the current deployment pipeline.

According to at least one embodiment, a continuous deployment success predictor (CDSP) may be used to augment a continuous deployment pipeline and provide the release manager with a success prediction score that may help the release manager to make more informed decisions regarding the state of the current continuous delivery pipeline.

The CDSP may provide the release manager or DevOps team with a dashboard that includes real-time notifications with a view into the health of the current pipeline. The CDSP may also detect discrepancies in the process and generate alarms at each step in the continuous deployment process. Previously recorded historical data may be used to analyze the health of the current deployment pipeline. A variety of data (i.e., indicators) may be used from each step (i.e., node) in the deployment pipeline (e.g., number of lines of code that has changed, time taken to generate a build, number of tests passed/failed, number of spins for a good build, etc.). Based on the data collected and analysis (that may include incorporating historical indicator data), the CDSP may calculate a success prediction score that may simplify making the decision to approve or reject rollout for release managers/DevOps teams. The CDSP's results may be used to predict whether a deployment may be a success or a failure before the deployment process is completed.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a deployment success prediction program 110a. The networked computer environment 100 may also include a server 112 that is enabled to run a deployment success prediction program 110b that may interact with a database 114 and a communication network 116. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the deployment success prediction program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the deployment success prediction program 110a, 110b (respectively) to provide a release manager a success prediction score for making informed decisions regarding the potential success of a current deployment pipeline. The delivery success prediction is explained in more detail below with respect to FIGS. 2 and 3.

Figure 2:
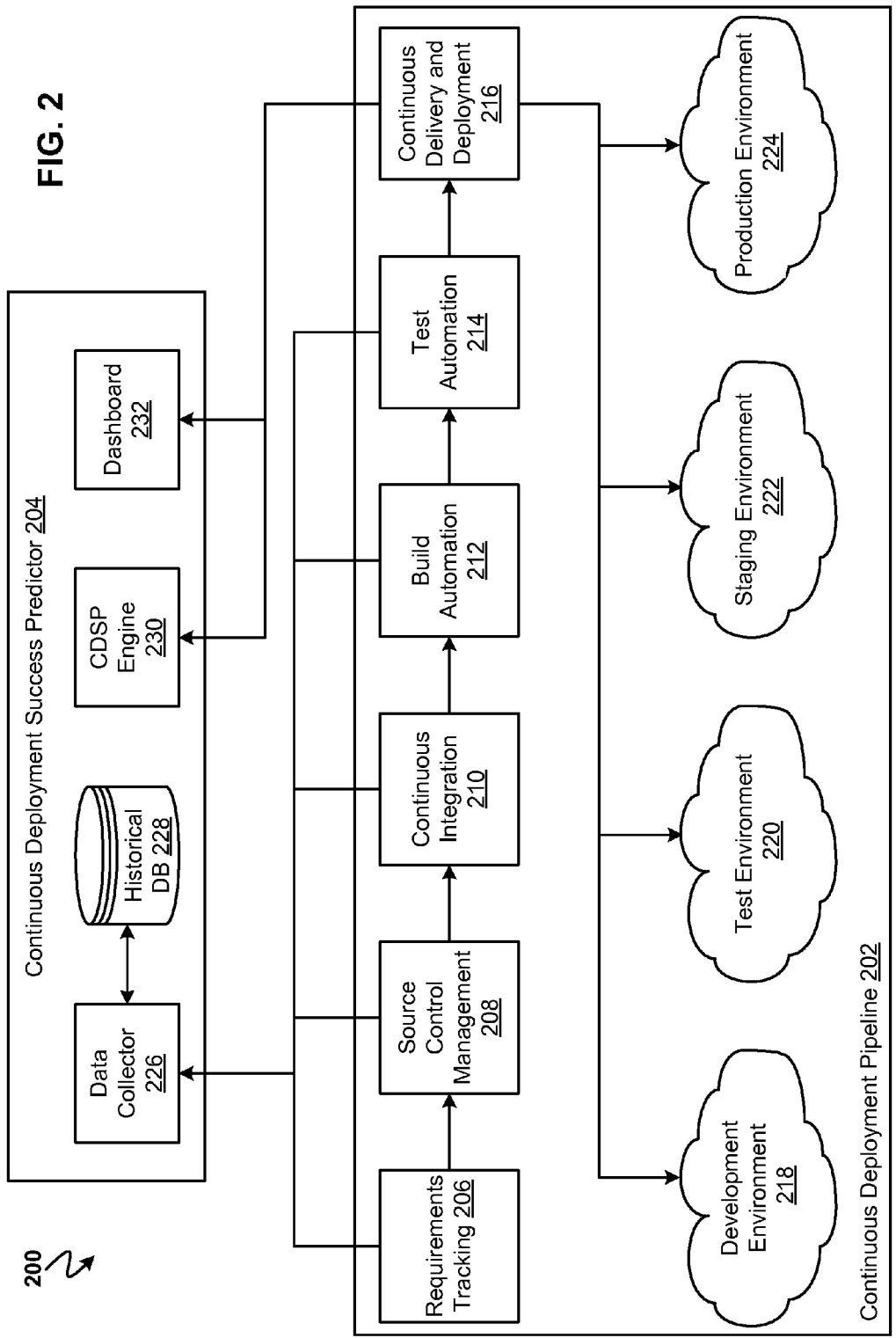
FIG. 2 is a system flow diagram of the continuous deployment success predictor operating with a continuous deployment pipeline according to at least one embodiment.

Referring now to FIG. 2, a system flow diagram 200 of a continuous deployment pipeline 202 with a continuous deployment success predictor (CDSP) 204 according to at least one embodiment is depicted.

The continuous deployment pipeline 202 includes multiple steps or nodes and multiple deployment environments. The steps depicted include a requirements tracking node 206, a source control management node 208, a continuous integration node 210, a build automation node 212, a test automation node 214, and a continuous delivery and deployment node 216.

The deployment environments depicted within the continuous deployment pipeline 202 include a development environment 218, a test environment 220, a staging environment 222, and a production environment 224. Typically, a software build or a solution is developed in the development environment 218 and then tested in the test environment 220. Final integration and system testing occurs in the staging environment 222 before being promoted into the production environment 224. In a cloud delivery model, the progression and movement of the build or solution through various builds and across the deployment environments is managed by using the continuous delivery and deployment environment.

According to at least one embodiment, the CDSP 204 includes a data collector 226, a historical database (DB) 228, a CDSP engine 230, and a dashboard 232.

A user indicates what information associated with specific pipeline nodes/steps (e.g., build automation 212, test automation 214, etc.) as well as details from the environments that should be collected by the CDSP 204 through the dashboard 232 (i.e., user interface). Therefore, the dashboard 232 provides the user with a way to select a pipeline node(s) and environment(s) as well as specify the data that the CDSP 204 should collect from the selected node(s) and environment(s).

The data collector 226 component of the CDSP 204 interacts with the pipeline node(s) the user specified based on the user's input into the dashboard 232. The CDSP engine 230 then communicates with the data collector 226 to monitor user specified data within pipeline nodes and environments based on the information the user entered into the dashboard 232.

The data collector 226 uses an application program interface (API) or agent provided by the pipeline system (e.g., Jenkins) to collect the data from the node(s) or environment(s) that the user flagged (or otherwise indicated) to be recorded. Once the data collector 226 receives data from a node(s) or environment(s), the data collector 226 sends the collected data to the CDSP engine 230, whereby the CDSP engine 230 stores the data in a data repository, such as the historical database 228.

Thereafter, the CDSP engine 230 compares the data that was collected to the historical data (i.e., historical indicators) stored in the historical database 228 to calculate a success prediction score. The success prediction score may be provided to the release manager/DevOps team in a separate dashboard 232 or the success prediction score may be queried through the API by other DevOps tools to create notifications in other dashboards 232. The process for calculating the success prediction score is explained in detail below with respect to FIG. 3.

Figure 3:
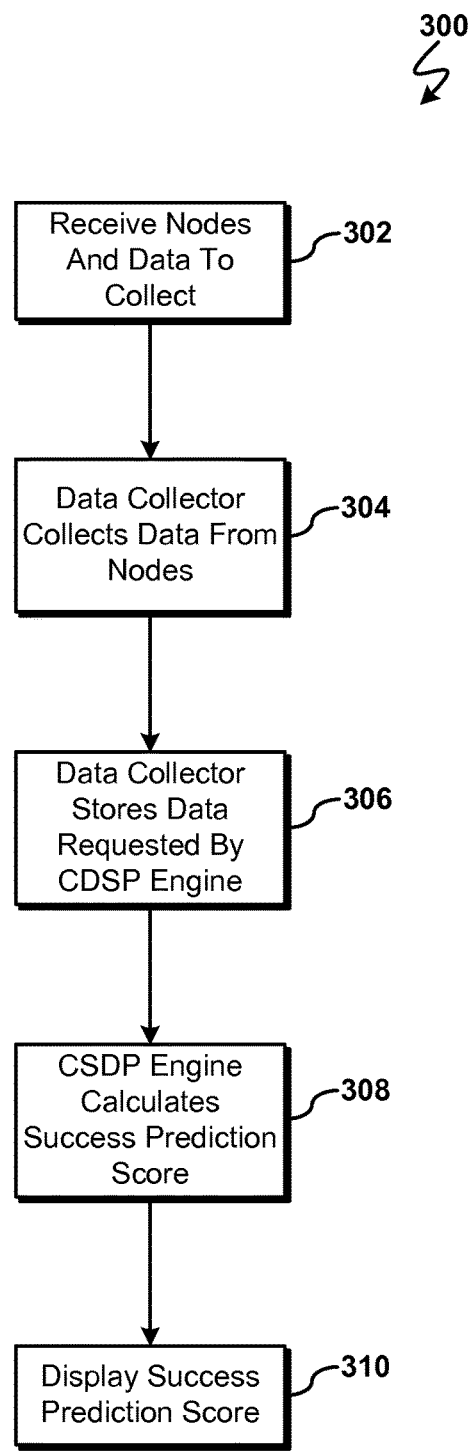
FIG. 3 is an operational flow chart illustrating a process for predicting deployment success according to at least one embodiment.

Referring now to FIG. 3, an operational flow chart illustrating the exemplary process 300 by the deployment success prediction program 110a and 110b (FIG. 1) according to at least one embodiment is depicted.

At 302, the user specified data (i.e., indicators) and associated pipeline nodes is received from the dashboard 232 (FIG. 2). According to at least one embodiment, the user (e.g., release manager) interacts with the dashboard 232 (FIG. 2) to indicate which pipeline nodes/steps (e.g., source control management 208 (FIG. 2)) or environments to target for data collection. Then, the user indicates what type of data the user wants to have collected from the target node(s) (e.g., source control management 208 (FIG. 2)), such as the number of code lines that have changed. After the user inputs the desired data and target pipeline node information in the dashboard 232 (FIG. 2), data and node information is sent by the dashboard 232 (FIG. 2) and received by the CDSP engine 230 (FIG. 2) at 302.

Next, at 304, the data collector 226 (FIG. 2) collects the specified data from the target pipeline nodes. According to at least one embodiment, the CDSP engine 230 (FIG. 2) forwards the user-specified data to be collected and target node information received from the dashboard 232 (FIG. 2) at 302 to the data collector 226 (FIG. 2). Once the data collector 226 (FIG. 2) receives the user-specified data to be collected and target node information, the data collector 226 (FIG. 2) communicates with each user-specified target node (e.g., source control management 208 (FIG. 2)) to collect the data (e.g., the number of code lines that have changed) the user specified. The data collector 226 (FIG. 2) then interacts with the target node using a method such as the target node's API to communicate a request to obtain the data that the user specified (e.g., the number of code lines that have changed). The node (e.g., source control management 208 (FIG. 2)) will then respond to the data collector's 226 (FIG. 2) request by sending the data that was requested (e.g., the number of code lines that have changed) to the data collector 226 (FIG. 2).

Then, at 306, data collector 226 (FIG. 2) stores the data requested by the CDSP engine 230 (FIG. 2) within the historical database 228 (FIG. 2). According to at least one embodiment, the data collector 226 (FIG. 2) accesses a data repository, such as a database (e.g., 114 (FIG. 1)), that is designated as the historical database 228 (FIG. 2). The historical database 228 (FIG. 2) is used to store the data (e.g., the number of code lines that have changed) specified by the CDSP engine 230 (FIG. 2) that was received from the pipeline node(s) (e.g., source control management 208 (FIG. 2)).

At 308, the CDSP engine 230 (FIG. 2) calculates the success prediction score based on the data stored in the historical database 228 (FIG. 2). According to at least one embodiment, the CDSP engine 230 (FIG. 2) calculates multiple elements (e.g., source code change complexity score, etc.) based on the collected data that is then used to calculate the success prediction score. The score generated for each element may also be weighted differently when used to calculate the overall success prediction score to reflect the organization's confidence or automation in certain pipeline steps compared to other steps. For example, if an organization feels more confident in the build automation node 212 (FIG. 2), the organization may assign a lower weight to the build automation node 212 (FIG. 2) since that step would not be as likely to impact the predicted success of the current continuous deployment pipeline 202 (FIG. 2).

For example, six elements may be specified by a user to form the basis for the final success prediction score. The first element may be a requirement/workitem complexity score (RCS) that may be calculated based on data collected from the requirements tracking node 206 (FIG. 2), such as the number of story points (e.g., in Rational Team Concert (RTC)) for a workitem or the complexity of the requirements captured in the lifecycle management tool (e.g., expressed in RTC as a requirement priority/severity).

The second element may be calculating a source code change complexity score (SCS) based on data collected from the source control management node 208 (FIG. 2) indicating the number of code lines that were changed and if any components that are designated as being critical were impacted due to the code changes.

The third element may be a build quality score (BQS) that may be calculated based on data collected from the build automation node 212 (FIG. 2) indicating the number of fixes included in the build, the number of build failures that occurred before reaching a good build, and the results of build verification tests.

The fourth element may be a test readiness score (TRS) that may be calculated based on data collected from the test automation node 214 (FIG. 2) indicating the number of tests failed against the number of tests performed and the comparison of current tests results with the test results of previous builds.

The fifth element may be a deployment environment fitness score (DES) that may be calculated based on data collected from the continuous delivery and deployment node 216 (FIG. 2) indicating the number of differences between the production environment and the previously passed production environment, the user/other third-party components involved, and the network connectivity to and from the target deployment environment.

The sixth element may be a current deployment progress score (CPS) that may be calculated based on data collected from the continuous delivery and deployment node 216 (FIG. 2) comparing the time taken to deploy a component or complete a step in the process against the previous deployment data collected for a similar build for an equivalent environment. The CPS calculation may incorporate historical data stored in the historical database 228 (FIG. 2) and other relevant data sources. Additionally, if the current deployment takes more time than is allowed for an equivalent environment based on the data from the historical database 228 (FIG. 2), the CDSP 204 (FIG. 2) generates an alert or notification for the release manager/DevOps team.

According to at least one embodiment, once the constituent elements have been calculated, the success prediction score is calculated as the inverse of a complexity score. For example, if the six elements described above (RCS, SCS, BQS, TRS, DES, and CPS) are used to calculate the complexity score, the complexity score may be calculated as follows:

Complexity Score=(RCS+SCS+BQS+TRS+DES+CPS)/100

Additionally, the complexity score may be augmented to include processes that may be specific to a particular development and delivery pipeline for a solution or product. For example, some projects may include a code review step after the source code is checked and before the build process begins. The CDSP 204 (FIG. 2) may then collect data related to the source code review process to calculate an additional constituent element score that becomes part of the complexity score calculation.

Once the complexity score has been determined, the inverse of the complexity score may then be calculated (i.e., 1/complexity score) to determine the success prediction score. The maximum success prediction score may be 1, whereby the score of 1 denotes that the deployment would be 100% successful.

According to at least one embodiment, each constituent element may be weighted differently in the final success prediction score by defining the maximum score each constituent element score may have of the total 100. For example, the maximum total score of 100 may be divided among the six constituent elements as RCS 20, SCS 20, BQS 20, TRS 20, DES 10, and CPS 10. Thus, the maximum scores for the six constituent elements total 100. However, since the maximum scores for DES and CPS are less than the other elements, the DES and CPS scores are weighted less and therefore have less impact in the total success prediction score. As described previously, an organization may alter the weight of each constituent element score to emphasize elements within the continuous deployment pipeline 202 (FIG. 2) to reflect the amount of confidence the organization has with each element within the continuous deployment pipeline 202 (FIG. 2).

In an example scenario, the requirement complexity score (RCS) element may be defined as having a minimum score of 0 and a maximum score of 20. If there are no new complex requirements added to the current software release, the score will be the minimum score. Otherwise the RCS given will be based on the current software project.

The code change complexity score (SCS) element may be defined as having a minimum score of 0 and a maximum score of 20. If there are many file changes included in the current release, the SCS will be high (e.g., greater than 10). However, if there are not many file changes in the current release, the SCS will be low (e.g., below 10).

The build quality score (BQS) element may be defined as having a minimum score of 0 and a maximum score of 20. If there have been bad software builds, or software build failures, before a good software build for the current release, the BQS will increase. For instance, regular builds (i.e., builds with failures reported) may receive a BQS of 0-5. Medium quality builds (i.e., builds with few errors reported) may receive a BQS of 5-10. Builds that have major failures (i.e., a good build was achieved after 3 or more attempts) may receive a BQS in the range of 10-20.

The test readiness score (TRS) may be defined as having a minimum score of 0 and a maximum score of 20. If all build tests passes verification without errors, the TRS will be low. However, if the build tests results in errors, the TRS score will be high.

The deployment environment fitness score (DES) may be defined as having a minimum score of 0 and a maximum score of 10. The DES having a defined maximum of 10 would indicate that relative to the other elements (i.e., RCS, SCS, BQS, and TRS), the organization operating the continuous deployment pipeline 202 (FIG. 2) may be more confident that the target deployment environment will not have much impact in determining the success of the continuous deployment pipeline 202 (FIG. 2). If the target deployment environment has had network or infrastructure changes, the risk for unsuccessful deployment is high and the DES will be high as a result.

The final element, the current deployment progress score (CPS) may be defined as having a minimum score of 0 and a maximum score of 10. Once the deployment process has started, if the time it takes to more time to deploy than previous builds, the CPS will increase.

If the constituent elements scores include an RCS of 4, an SCS of 10, a BGS of 10, a TRS of 5, a DES of 7, and a CPS of 4, the complexity score would be calculated according to the previously described formula and result in a complexity score of 4 (i.e., (4+10+10+5+7+4)/100=40/100=4). The success prediction score would then be calculated as the inverse of the complexity score, thus the success prediction score would be ¼ (i.e., 1/complexity score) or 0.25.

Next, at 310, the calculated success prediction score is displayed to the release manager/DevOps team for review. According to at least one embodiment, the calculated success prediction score is displayed using the DevOps tooling used (e.g., Jenkins, etc.). Based on the pipeline's calculated success prediction score, an organization using the pipeline may determine whether to allow or not allow the pipeline to proceed to production deployment. For example, a success prediction score of 0.75 may be used as a threshold value by an organization and if the success prediction score is determined to be less than 0.75 (e.g., 0.25), the organization may decide that the current continuous deployment pipeline 202 (FIG. 2) may require further scrutiny before rollout. According to at least one other embodiment, the success prediction score is displayed in the dashboard 232 (FIG. 2).

It may be appreciated that FIGS. 2 and 3 provide only an illustration of one embodiment and does not imply any limitations with regard to how different embodiments may be implemented. Many modifications to the depicted embodiment(s) may be made based on design and implementation requirements.

Figure 4:
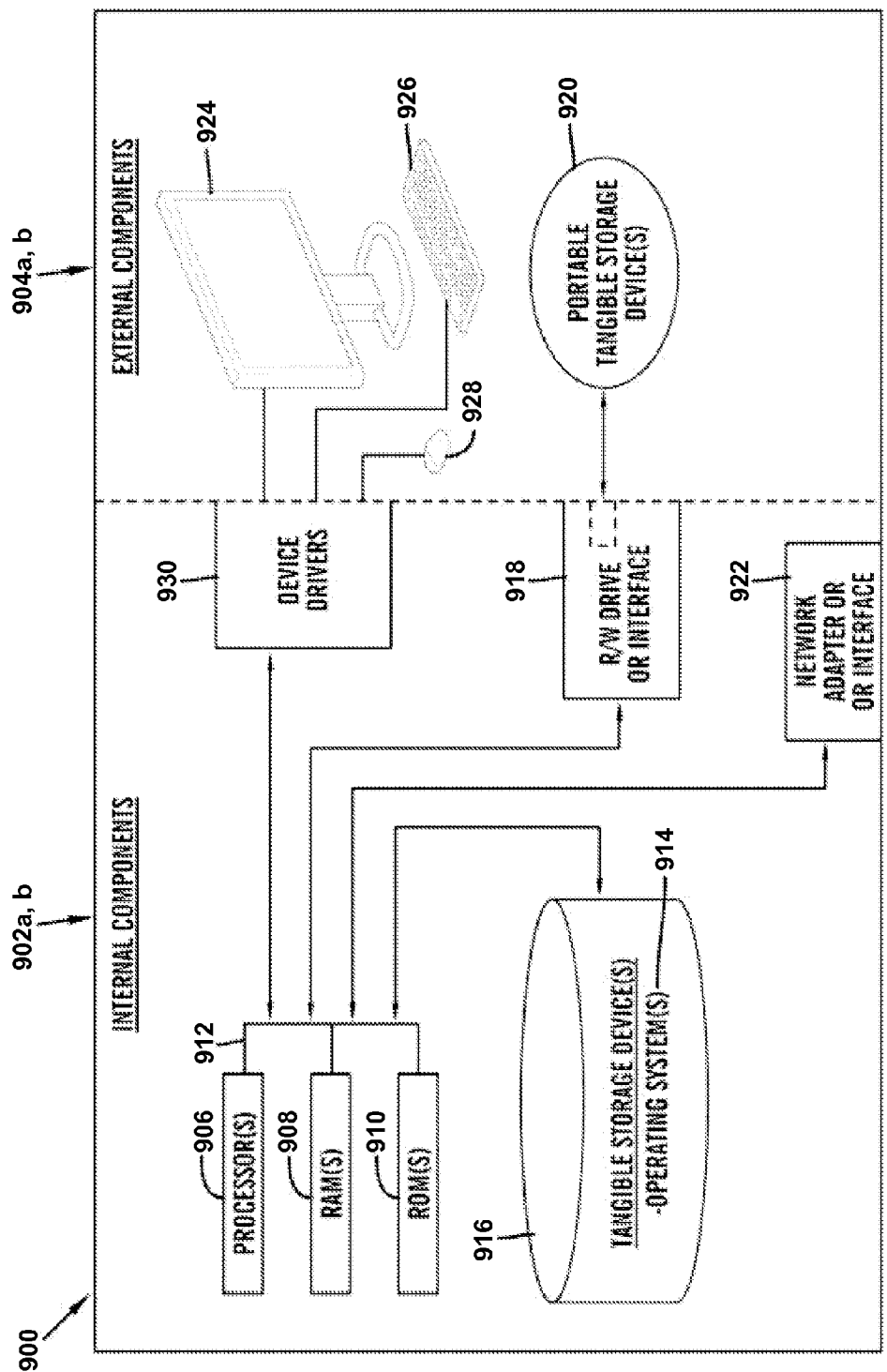
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 *a, b* and external components 904 *a, b* illustrated in FIG. 4. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the deployment success prediction program 110*a* (FIG. 1) in client computer 102 (FIG. 1) and the deployment success prediction program 110*b* (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the deployment success prediction program 110*a* and 110*b* (FIG. 1) can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the deployment success prediction program 110*a* (FIG. 1) in client computer 102 (FIG. 1) and the deployment success prediction program 110*b* (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the deployment success prediction program 110*a* (FIG. 1) in client computer 102 (FIG. 1) and the deployment success prediction program 110*b* (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
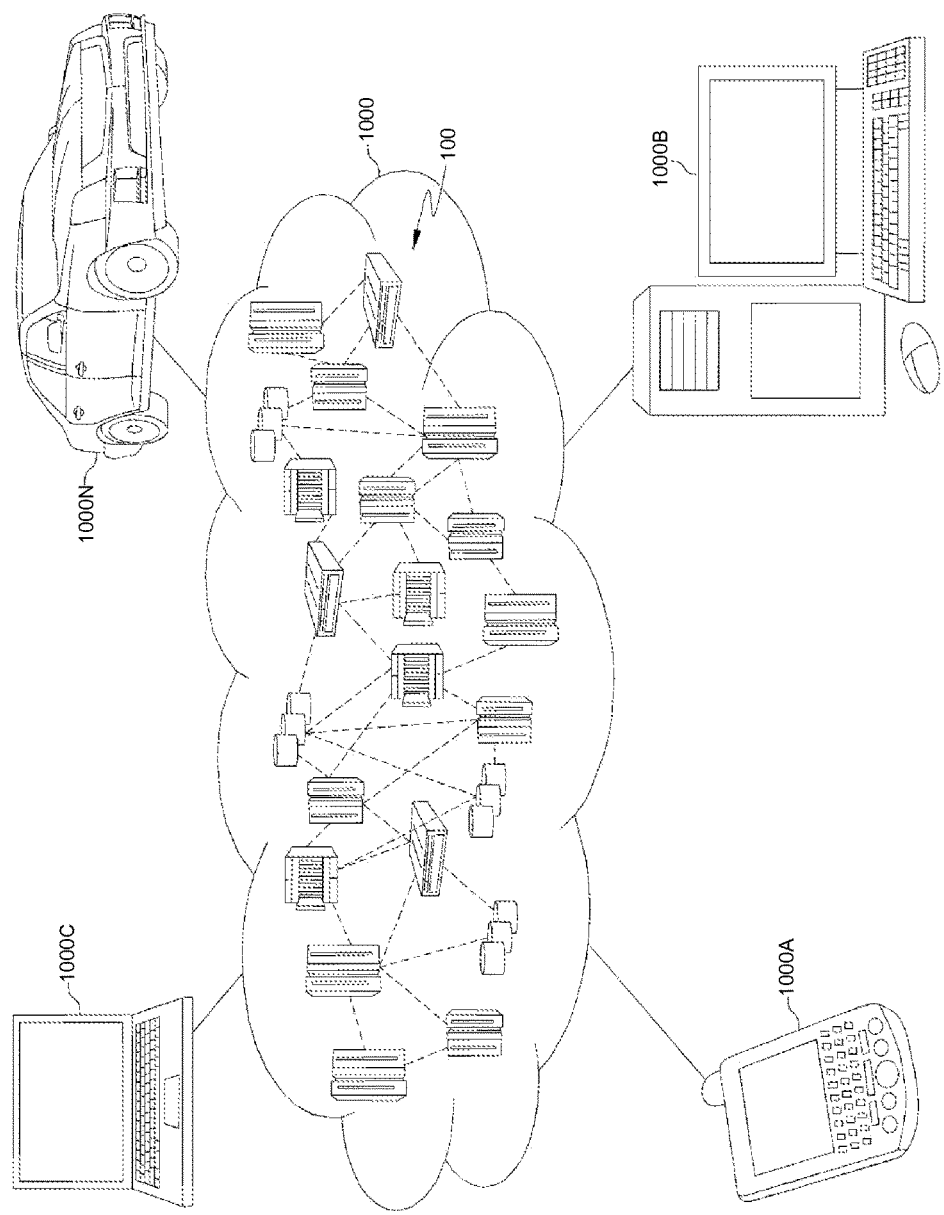
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
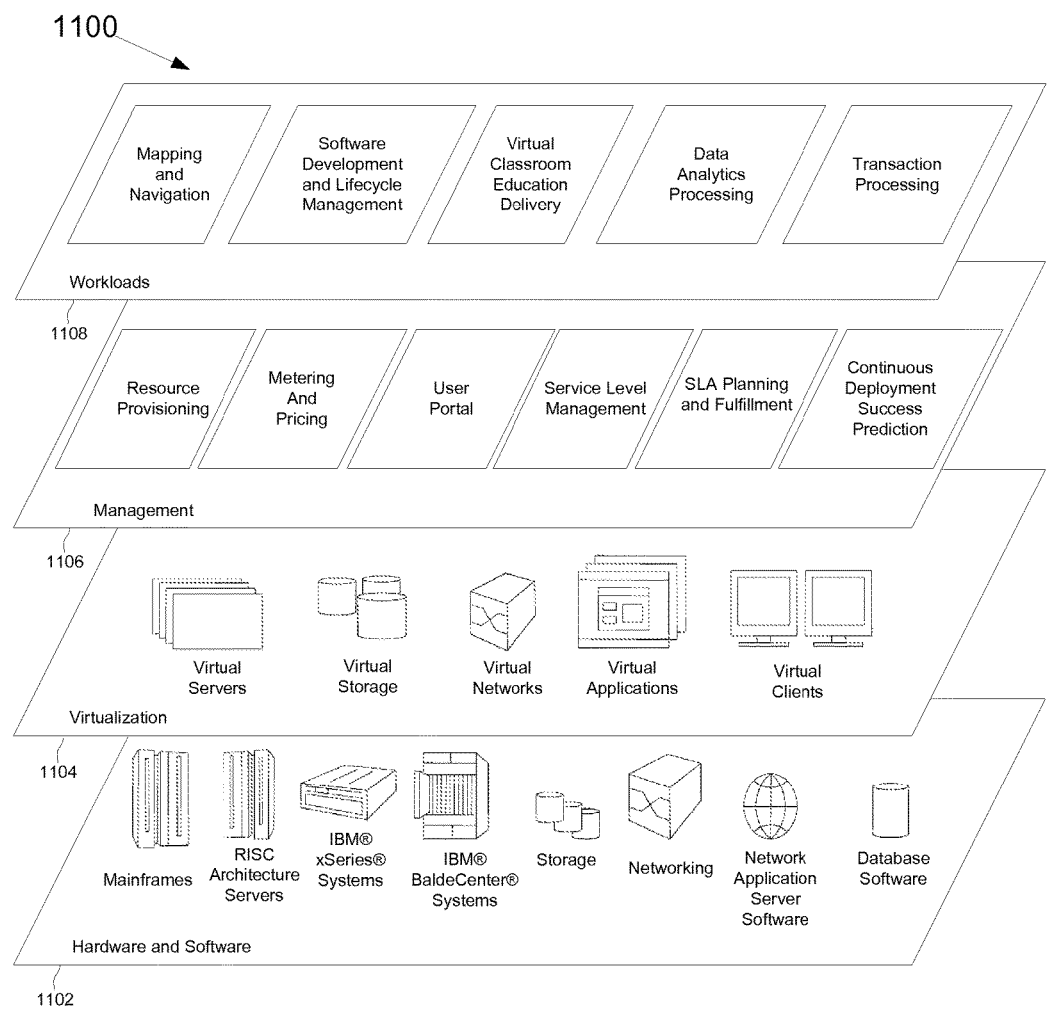
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes; RISC (Reduced Instruction Set Computer) architecture based servers; storage devices; networks and networking components. In some embodiments, software components include network application server software.

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Continuous deployment success prediction provides analysis of a current deployment pipeline and return a success prediction score to a release manager/DevOps team to make better informed decisions regarding the viability of the current deployment pipeline.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for predicting deployment success of a continuous deployment pipeline, the method comprising:

receiving, by a processor, a user request for a plurality of indicators from a plurality of nodes, wherein each indicator within the plurality of indicators is associated with a node within the plurality of nodes and wherein the plurality of nodes are associated with the continuous deployment pipeline;

requesting the plurality of indicators from the plurality of nodes based on the received user request;

receiving the requested plurality of indicators from the plurality of nodes;

storing the received plurality of indicators in a data repository;

calculating a plurality of constituent element scores based on the stored plurality of indicators, wherein the plurality of constituent element scores includes a requirement complexity score a source code change complexity score a build quality score a test readiness score a deployment environment fitness score and a current deployment progress score;

calculating a success prediction score based on the calculated plurality of constituent element scores; and outputting the calculated success prediction score to a user;

wherein requesting the plurality of indicators comprises using an application program interface (API) associated with each node within the plurality of nodes.

2. The method of claim 1, wherein receiving the user request for the plurality of indicators and the plurality of nodes comprises the user indicating the plurality of indicators and the plurality of nodes by using a user dashboard.

3. The method of claim 2, wherein the outputting the calculated success prediction score to the user comprises generating a notification and sending the notification to the user dashboard.

4. The method of claim 1, wherein calculating the success prediction score comprises determining an inverse of a sum of each constituent element score within the plurality of constituent element scores divided by 100.

5. The method claim 1, wherein calculating the success prediction score based on the calculated plurality of constituent element scores comprises comparing the plurality of indicators with a plurality of historical indicators.

6. A computer system for predicting continuous deployment success of a continuous deployment pipeline, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising: receiving a user request for a plurality of indicators from a plurality of nodes, wherein each indicator within the plurality of indicators is associated with a node within the plurality of nodes and wherein the plurality of nodes are associated with the pipeline;

requesting the plurality of indicators from the plurality of nodes based on the received user request;

receiving the requested plurality of indicators; storing the received plurality of indicators in a data repository;

calculating a plurality of constituent element scores based on the stored plurality of indicators, wherein the plurality of constituent element scores includes a requirement complexity score a source code change complexity score a build quality score a test readiness score a deployment environment fitness score and a current deployment progress score;

calculating a success prediction score based on the calculated plurality of constituent element scores; and outputting the calculated success prediction score to the user;

wherein requesting the plurality of indicators comprises using an application program interface (API) associated with each node within the plurality of nodes.

7. The computer system of claim 6, wherein receiving the user request for the plurality of indicators and the plurality of nodes comprises the user indicating the plurality of indicators and the plurality of nodes by using a user dashboard.

8. The computer system of claim 7, wherein the outputting the calculated success prediction score to the user comprises generating a notification and sending the notification to the user dashboard.

9. The computer system of claim 6, wherein calculating the success prediction score comprises determining an inverse of a sum of each constituent element score within the plurality of constituent element scores divided by 100.

10. The computer system claim 6, wherein calculating the success prediction score based on the calculated plurality of constituent element scores comprises comparing the plurality of indicators with a plurality of historical indicators.

11. A computer program product for predicting continuous deployment success of a continuous deployment pipeline, comprising:

one or more computer-readable storage medium and program instructions stored on at least one of the one or more tangible storage medium, the program instructions executable by a processor, the program instructions comprising:

program instructions to receive a user request for a plurality of indicators from a plurality of nodes, wherein each indicator within the plurality of indicators is associated with a node within the plurality of nodes and wherein the plurality of nodes are associated with the pipeline;

program instructions to request the plurality of indicators from the plurality of nodes based on the received user request; program instructions to receive the requested plurality of indicators;

program instructions to store the received plurality of indicators in a data repository;

program instructions to calculate a plurality of constituent element scores based on the stored plurality of indicators, wherein the plurality of constituent element scores includes a requirement complexity score a source code change complexity score a build quality score a test readiness score a deployment environment fitness score and a current deployment progress score program instructions to calculate a success prediction score based on the calculated plurality of constituent element scores; and program instructions to output the calculated success prediction score to the user;

wherein requesting the plurality of indicators comprises using an application program interface (API) associated with each node within the plurality of nodes.

12. The computer program product of claim 11, wherein receiving the user request for the plurality of indicators and the plurality of nodes comprises the user indicating the plurality of indicators and the plurality of nodes by using a user dashboard.

13. The computer program product of claim 12, wherein outputting the calculated success prediction score to the user comprises generating a notification and sending the notification to the user dashboard.

14. The computer program product of claim 11, wherein calculating the success prediction score comprises determining an inverse of a sum of each constituent element score within the plurality of constituent element scores divided by 100.

* * * * *